3,527,657
PROCESS FOR INCREASING THE BOND STRENGTH BETWEEN RUBBER AND TEXTILES USING N-SUBSTITUTED 1,3,5-DIOXAZINE

Wolfgang Huther, Cologne-Mulheim, Ivo Dane, Leverkusen, Guido Fromandi, Schildgen, and Paul Schneider, Opladen, Germany, assignors to Farbenfabriken Bayer Aktiengesellschaft, Leverkusen, Germany, a corporation of Germany
No Drawing. Filed July 14, 1966, Ser. No. 565,082
Claims priority, application Germany, Aug. 11, 1965, F 46,863
Int. Cl. C08d 13/16
U.S. Cl. 117—138.8                                        14 Claims

ABSTRACT OF THE DISCLOSURE

Increasing the bond strength between rubber and textiles by the addition of an N-substituted 1,3,5-dioxazine to a vulcanizable mixture of natural or synthetic rubber which is applied to the textile and vulcanized. Benzene derivatives substituted in the m-position by amino or hydroxy or etherified or esterified hydroxy or condensates thereof with dialkyl ketones, formaldehyde, alkyl aldehydes or aryl aldehydes or 1,5-dihydroxynaphthalene may also be included in said vulcanizable mixture.

---

This invention relates to a process for increasing the bond strength between rubber and textiles.

Textiles are worked into a large number of rubber products, for example car tires, conveyor belts or hoses, in order to strengthen or reinforce them. One important requirement in cases such as these is that there should be a good bond between rubber and fabric. This requirement cannot be satisfied, particularly with the increasingly popular use of semi- and fully synthetic fabrics, unless special measures are taken.

To obtain a bond of adequate strength between rubber and textiles, the textiles have until now usually been provided with pre-impregnations. Nowadays, such impregnations are generally based on latices of elastomers and resorcinol-formaldehyde resins dissolved or dispersed in water. Normally, the formaldehyde resins are not fully condensed, being further condensed as processing continues by the addition of formaldehyde. In many instances, however, the bond strength provided by such impregnations is inadequate.

It has been found that the bond strength between rubber and textiles can be increased very considerably by adding to the vulcanisable mixture based on natural or synthetic rubber which is applied to the textile material, N-substituted 1,3,5-dioxazines and, optionally, benzene derivatives substituted in the m-position by amino- and/or by optionally etherified or esterified hydroxy groups, or their condensates with dialkyl ketones, formaldehyde or alkyl or aryl aldehydes, or 1,5-dihydroxynaphthalene in place of the benzene derivatives.

The bond or adhesion of the rubber both to preimpregnated and to non-impregnated textiles is improved by additives such as these. Among the nonimpregnated fibrous materials, a particularly marked effect is obtained in the case of polyamide fibres.

The dioxazines used in accordance with the invention may contain, as substituent on the nitrogen atom, linear or branched, saturated or unsaturated, optionally substituted alkyl radicals with preferably 3 to 10 carbon atoms, cyclohexyl, cyclopentyl or phenyl radicals, or phenyl alkyl radicals with preferably 1 to 4 carbon atoms in the alkyl group. The substituent itself may be substituted by alkyl groups with preferably 1 to 4 carbon atoms, by hydroxy, alkyloxy, ester, amino, nitro or nitrile groups, and may even contain further dioxazine rings. Examples of such compounds are: N-allyl-1,3,5-dioxazine; N-propyl-1,3,5-dioxazine; N-n-butyl-1,3,5-dioxazine; N-isobutyl-1,3,5-dioxazine; N-cyclohexyl-1,3,5-dioxazine; N - phenyl - 1,3,5-dioxazine; N-benzyl-1,3,5-dioxazine; N-($\beta$-hydroxyethyl) - 1,3,5 - dioxazine; N-acetic acid ethyl ester-1,3,5-dioxazine and N,N'-ethylene-bis-(1,3,5-dioxazine).

The dioxazines may be prepared, for example, in known manner by reacting the corresponding amines with an excess of formaldehyde. In place of the pure compounds, it is also possible to use the mixtures formed during this reaction with condensation products containing formaldehyde to a greater or lesser extent. For example, the crude products of amine-formaldehyde condensation which, in addition to N-allyl-1,3,5-dioxazine, also contain a minor proportion of N,N'-diallyl-1,3,5-oxadiazine and N,N',N''-triallylhexahydro-1,3,5-triazine, can be used in place of the pure N-allyl-1,3,5-dioxazine.

Resorcinol is preferably used as the benzene derivative. Further examples of such compounds are m-aminophenol; m-phenylene diamine; resorcinol diacetate, propionate or butyrate; and resorcinol monomethyl ether or propyl ether. Examples of condensation products with carbonyl compounds are incompletely condensed resins of resorcinol with formaldehyde in a molar ratio from 1:0.5 to 1:0.9 or condensates of resorcinol with acet-aldehyde in a molar ratio from 1:0.5 to 1:1, or condensates of resorcinol with acetone in a molar ratio from 1:0.5 to 1:2.

The dioxazines according to the invention are mixed into the rubber mixture to be applied to textiles in quantities of, for example, 0.2 to 8% by weight, preferably 0.5 to 4% by weight. The adhesion-promoting effect is improved very considerably by the addition of resorcinol or other m-substituted benzene derivatives in approximately equivalent quantities, but preferably in quantities from half to twice as large. When the resorcinol is being mixed in, the temperature of the mixture should be kept above the melting point of resorcinol (above 115° C.). Even when the other benzene derivatives referred to above are used, it is of advantage to keep the temperature of the rubber mixture above the melting point of these substances during their addition.

Suitable types of rubber for the mixture are both natural and synthetic rubbers, such as copolymers of butadiene-styrene, butadiene-acrylonitrile, isobutylene-isoprene, ethylene-propylene (usually with a third component) as well as polyisoprene, polybutadiene and polychlorobutadiene, as well as mixtures thereof.

Suitable textiles are filaments (cord filaments in particular) and fabrics woven or knitted from all kinds of natural or synthetic fibres such as polyamides, polyesters, polyacrylonitrile and cellulose, e.g., rayon and cotton. The adhesion-promoting pre-impregnation of the textiles may be carried out in one of the impregnating baths commonly used in the art containing, for example, latices based on natural rubber, butadiene-styrene, butadiene-acrylonitrile, chlorobutadiene, butadiene - styrene - vinyl pyridine polymers or mixtures thereof, and preferably resorcinol-formaldehyde resins.

3

The textiles are coated with the rubber mixture according to the invention by the processes normally used in the rubber industry. The end products, too, are vulcanised by conventional processes.

EXAMPLE 1

Two tire-carcass mixtures of the following composition were prepared on a set of mixing rolls:

| Mixture | Parts by weight | |
|---|---|---|
| | A | B |
| Natural rubber | 100 | 100 |
| Lampblack | 20 | 20 |
| Resorcinol | -- | 2.5 |
| Zinc oxide | 5 | 5 |
| Pinewood oil | 2 | 2 |
| Aromatic mineral oil | 4 | 4 |
| Phenyl-α-naphthylamine | 1.5 | 1.5 |
| Sulphur | 2.3 | 2.3 |
| Benzothiazyl-2-cyclohexyl-sulphenamide | 0.7 | 0.7 |
| Diphenyl guanidine | 0.1 | 0.10 |
| N-allyl-1,3,5-dioxazine | -- | 2.0 |

A master batch of rubber, carbon black and, optionally, resorcinol, was initially prepared at a mixing temperature of 130° C. After it had been cooled to 100° C., the remaining components were added, followed ultimately by the addition of the N-allyl-1,3,5-dioxazine.

Rayon cord filaments (den. 1650/1 x 2) were incorporated during vulcanisation between pairs of 40 cm. long, 3 mm. thick and 2 cm. wide strips, prepared from the aforementioned mixtures, perpendicular to the strips and at intervals of 1.5 cm. The filaments had been impregnated beforehand with an impregnating mixture of the following composition:

| | Pts. by wt. |
|---|---|
| Natural rubber latex (60% by weight) | 125 |
| Latex of a copolymer of butadiene, styrene and vinyl pyridine (40% by weight) | 62.5 |
| Precondensed resorcinol-formaldehyde resin | 20.0 |
| Formaldehyde solution (30% by weight) | 20 |
| Water | 1872.5 |
| | 2100.0 |

Overall dry content=6%

The filaments were heated at 135° C. for 10 minutes during the drying process. The test specimens containing the filaments were vulcanised for 50 minutes at 138° C.

In order to determine the static bond strength, individual test specimens, each 1.5 cm. long, were punched out of the test strips in such a way that there was one cord filament in the middle of each (length embedded=2 cm.). After pre-heating to 80° C., the force required to rip the filament out of the rubber was measured in a chamber heated at 80° C.

Dynamic bond strength was determined by clamping the test strip described above in the movable part of a testing machine and heating it to 80° C. The projecting ends of the cord filaments were anchored or fixed to the stationary part of the machine. The rubber was then reciprocated 500 times per minute over a total length of 2.5 mm. (±1.25 mm.). The time which passed before the cord filament was detached from the rubber under this strain was then measured.

Both the bond-strength testing methods are described at length in "Bayer Mitteilungen fur die Gummi-Industrie" No. 29, pp. 71–81.

The following bond strengths were obtained:

IMPREGNATED RAYON CORD

| | Mixture A | Mixture B |
|---|---|---|
| Static bond strength at 80° C., kg | 5.4 | 9.2 |
| Dynamic bond strength at 80° C., mins | 120 | 222 |

EXAMPLE 2

Tests similar to those described in Example 1 were conducted with non-impregnated nylon cord filaments (den. 840/1 x 2). In addition to mixture A, as comparison embedding mixture for the cord filaments, a mixture C was used. The only difference between mixture C and mixture B of Example 1 was that the quantity of resorcinol had been reduced to 1.3 parts by weight and the quantity of N-allyl-1,3,5-dioxazine to 1.0 part by weight. The bond strengths were as follows:

NON-IMPREGNATED NYLON CORD

| | Mixture A | Mixture C |
|---|---|---|
| Static bond strength at 80° C., kg | 1.9 | 7.6 |
| Dynamic bond strength at 80° C., mins | 10 | 230 |

EXAMPLE 3

Tests similar to those described in Example 2 were again conducted on non-impregnated nylon cord filaments. In addition to comparison mixture A, a mixture D was used which only differed from mixture C in that the quantity of resorcinol was 2.5 parts by weight whilst the N-allyl-1,3,5-dioxazine was replaced by 2.0 parts by weight of N-phenyl-1,3,5-dioxazine. The following bond strengths were obtained:

NON-IMPREGNATED NYLON CORD

| | Mixture A | Mixture D |
|---|---|---|
| Static bond strength at 90° C., kg | 2.4 | 10.0 |
| Dynamic bond strength at 80° C., mins | 19 | >300 |

EXAMPLE 4

Tests similar to those described in Example 1 were conducted on similarly impregnated rayon cord using mixture A and an embedding mixture E, which had the same composition as mixture B, although an equivalent quantity of N-butyl-1,3,5-dioxazine was used in place of N-allyl-1,3,5-dioxazine. The following bond strengths were measured:

IMPREGNATED RAYON CORD

| | Mixture A | Mixture E |
|---|---|---|
| Static bond strength at 80° C., kg | 8.8 | 10.3 |
| Dynamic bond strength at 80° C., mins | 134 | 200 |

EXAMPLE 5

Tests similar to those described in Example 2 were conducted on non-impregnated nylon cord using mixture A and mixture F which had the same composition as mixture C, except that the N-allyl-1,3,5-dioxazine was replaced by 2.0 parts by weight of N-butyl-1,3,5-dioxazine and the quantity of resorcinol was increased to 2.5 parts by weight. The following bond strengths were obtained:

NON-IMPREGNATED NYLON CORD

| | Mixture A | Mixture F |
|---|---|---|
| Static bond strength at 80° C., kg | 2.2 | 4.5 |
| Dynamic bond strength at 80° C., mins | 11 | 110 |

EXAMPLE 6

Tests similar to those described in Example 5 were conducted on non-impregnated nylon cord using embedding mixtures in which mixture F was replaced by a mixture G which, instead of N - butyl - 1,3,5 - dioxazine, contained 2.0 parts by weight of N-isobutyl-1,3,5-dioxazine. The following bond strengths were obtained:

NON-IMPREGNATED NYLON CORD

| | Mixture A | Mixture G |
|---|---|---|
| Static bond strength at 80° C., kg | 2.3 | 6.0 |
| Dynamic bond strength at 80° C., mins | 40 | 201 |

EXAMPLE 7

Tests similar to those described in Example 1 were conducted with rayon cord which had been impregnated as described in that example. In this example, mixture B was replaced by a mixture H which, instead of N-allyl-1,3,5-dioxazine, contained 2.0 parts by weight of N-acetic acid ethyl ester-1,3,5-dioxazine, and no resorcinol. The following bond strengths were obtained:

IMPREGNATED RAYON CORD

|  | Mixture A | Mixture H |
|---|---|---|
| Static bond strength at 80° C., kg | 8.7 | 10.2 |
| Dynamic bond strength at 80° C., mins | 110 | 125 |

EXAMPLE 8

Example 2 was repeated using non-impregnated nylon cord which was impregnated with mixture A and mixture J, which differed from mixture C in that it contained 1.0 part by weight of N-cyclohexyl-1,3,5-dioxazine in place of N-allyl-1,3,5-dioxazine. The following bond strengths were obtained:

NON-IMPREGNATED NYLON CORD

|  | Mixture A | Mixture J |
|---|---|---|
| Static bond strength at 80° C., kg | 1.5 | 3.8 |
| Dynamic bond strength at 80° C., mins | 8 | 135 |

EXAMPLE 9

The following two rubber mixtures intended for industrial application were prepared on a set of mixing rolls:

| Mixture | Parts by Weight | |
|---|---|---|
|  | K | L |
| Natural rubber | 50 | 50 |
| Styrene-butadiene rubber | 50 | 50 |
| HAF-carbon black | 20 | 20 |
| MT-carbon black | 45 | 45 |
| Resorcinol |  | 2.5 |
| Zinc oxide | 5 | 5 |
| Stearic acid | 1 | 1 |
| Factice | 10 | 10 |
| Aromatic mineral oil | 3 | 3 |
| Styrenised diphenylamine | 1.5 | 1.5 |
| Benzothiazyl-2-cyclohexyl-sulphenamide | 1.8 | 1.8 |
| Condensation product of acrolein with aromatic bases | 1 | 1 |
| Sulphur | 2 | 2 |
| N-allyl-1,3,5-dioxazine |  | 2 |

A master batch of rubber, carbon black and in the case of mixture L, resorcinol, was initially prepared at a mixing temperature of 130° C. After this master batch had been cooled to 100° C., the remaining components of the mixture were added, followed ultimately, in the case of mixture L, by the addition of the N-allyl-1,3,5-dioxazine.

Approx. 1 mm.-thick wafers prepared from these mixtures were each placed between two pieces of non-pretreated leno or gauze cloth of cotton (weight per square metre=240 g.), rayon (weight per square metre=320 g.), nylon (weight per square metre=440 g.) and polyester (weight per square metre=370 g.), and then vulcanised in a press at a pressure of 20 kg./cm.². 2.5 cm. wide strips were then punched out of the panels thus obtained. The force required to separate strips of fabric from the rubber was measured at room temperature on a tensile elongation testing machine with inertialess indication. The test results were then evaluated with the aid of a stress-strain diagram, in which case the mean value was determined in each case from the 10 highest values of one diagram. The test data set out in the following were each obtained from five test strips:

LENO OR GAUZE CLOTH OF COTTON, RAYON, NYLON AND POLYESTER, NON-IMPREGNATED

|  | Bond strengths as measured on 2.5 cm.-wide strips at room temperature | |
|---|---|---|
|  | Mixture K | Mixture L |
| Cotton fabric, kg | 2.7 | 4.9 |
| Rayon fabric, kg | 1.5 | 6.5 |
| Nylon fabric, kg | 1.1 | 6.6 |
| Polyester, kg | 0.8 | 2.4 |

EXAMPLE 10

The following mixtures were prepared on the basis of butadiene-acrylonitrile rubber:

| Mixture | Parts by weight | | |
|---|---|---|---|
|  | M | N | O |
| Butadiene-acrylonitrile rubber | 100.0 | 100.0 | 100.0 |
| SRF-carbon black | 30.0 | 30.0 | 30.0 |
| FEF-carbon black | 20.0 | 20.0 | 20.0 |
| Resorcinol |  | 1.25 | 2.5 |
| Zinc oxide | 5.0 | 5.0 | 5.0 |
| Cumarone resin | 5.0 | 5.0 | 5.0 |
| Xylene-formaldehyde resin | 10.0 | 10.0 | 10.0 |
| Stearic acid | 2.5 | 2.5 | 2.5 |
| N-phenyl-N'-cyclohexyl-p-phenylenediamine | 0.8 | 0.8 | 0.8 |
| Phenyl-α-naphthylamine | 0.8 | 0.8 | 0.8 |
| Sulphur | 2.0 | 2.0 | 2.0 |
| N-cyclohexyl-2-benzothiazyl-sulphenamide | 1.5 | 1.5 | 1.5 |
| N-phenyl-1,3,5-dioxazine |  | 1.0 | 2.0 |

As in Example 1, a master batch of rubber, carbon black and, with mixtures N and O, resorcinol, was initially prepared at a mixing temperature of 130° C. After this master batch had been cooled to 100° C., the remaining components of the mixture were added, followed ultimately, in the case of mixtures N and O, by the introduction of the N-phenyl-1,3,5-dioxazine.

Rayon cord filaments, den. 1650/1 x 2) impregnated as in Example 1, and non-impregnated nylon cord filaments (den. 1680/1 x 2) were then incorporated by vulcanisation and tested for their static bond strength at 80° C. by the method described in Example 1. The following bond strengths were obtained:

| Mixture | M | N | O |
|---|---|---|---|
| Impregnated rayon cord, kg | 4.6 | 7.8 | 9.3 |
| Non-impregnated nylon cord, kg | 3.0 | 11.4 | 17.5 |

EXAMPLE 11

The following mixtures were prepared on the basis of styrene-butadiene rubber:

| Mixture | Parts by weight | | |
|---|---|---|---|
|  | P | Q | R |
| Styrene-butadiene rubber | 100.0 | 100.0 | 100.0 |
| HMF-carbon black | 25.0 | 25.0 | 25.0 |
| Resorcinol |  | 1.25 | 2.5 |
| Zinc oxide | 5.0 | 5.0 | 5.0 |
| Aromatic mineral oil | 8.0 | 8.0 | 8.0 |
| Phenyl-α-naphthylamine | 1.5 | 1.5 | 1.5 |
| Cumarone resin | 2.0 | 2.0 | 2.0 |
| Sulphur | 1.8 | 1.8 | 1.8 |
| N-cyclohexyl-2-benzothiazyl-sulphenamide | 1.2 | 1.2 | 1.2 |
| Thiuram monosulphide | 0.15 | 0.15 | 0.15 |
| N-phenyl-1,3,5-dioxazine |  | 1.0 | 1.0 |

The mixture was prepared by the method described in Example 10:

As in Example 10, similarly impregnated rayon cord filaments and non-impregnated nylon cord filaments were then tested for their bond strength. The vulcanisation and bond strength testing methods used were the same as those described in Example 10.

The bond strengths obtained were as follows:

| Mixture | P | Q | R |
|---|---|---|---|
| Impregnated rayon cord, kg | 9.6 | 12.2 | 11.5 |
| Non-impregnated nylon cord, kg | 2.8 | 4.6 | 6.2 |

EXAMPLE 12

Tests similar to those described in Examples 1 and 2 were conducted with impregnated rayon filaments and non-impregnated nylon filaments. In addition to the comparison mixture A which did not contain any additives, a mixture S and a mixture T were used. The only difference between mixture S and mixture C of Example 2 was that it contained 1.3 parts by weight of m-phenylene diamine instead of 1.3 parts by weight of resorcinol, whilst mixture T contained 1.3 parts by weight of m-aminophenol instead of the resorcinol of mixture C.

The following bond strengths were measured:

| Mixture | A | S | T |
|---|---|---|---|
| Impregnated rayon cord: | | | |
| Static bond strengths at 80° C., kg | 9.6 | 12.7 | 12.3 |
| Dynamic bond strengths at 80° C., mins | 146 | 214 | 240 |
| Non-impregnated nylon cord: | | | |
| Static bond strengths at 80° C., kg | 1.5 | 4.2 | 6.2 |
| Dynamic bond strengths at 80° C., mins | 50 | 80 | 196 |

What we claim is:

1. In the process of bonding a vulcanizable rubber mixture by vulcanization in direct adhesion ot a textile fabric said textile fabric being selected from the group consisting of cellulose, polyacrylonitrile, polyamides and polyesters, the improvement comprising incorporating in said vulcanizable mixture an N-substituted 1,3,5-dioxazine.

2. The process of claim 1 in which said cellulose is selected from the group consisting of rayon and cotton.

3. The improved process of claim 1 wherein said rubber is selected from the group consisting of natural rubber, polyisoprene, polybutadiene, poly-chlorobutadiene, copolymers of butadiene-styrene, butadiene-acrylonitrile, isobutylene-isoprene and ethylene-propylene and mixtures thereof.

4. The improved process of claim 1 wherein said dioxazine is N-allyl-1,3,5-dioxazine.

5. The improved process of claim 1 wherein said dioxazine is N-phenyl-1,3,5-dioxazine.

6. The improved process of claim 1 wherein said vulcanizable mixture also includes a member selected from the group consisting of 1.5-dihydroxynaphthalene, m-phenylene diamine, m-aminophenol, resorcinol, etherified and esterified m-aminophenol and resorcinol and condensates of m-aminophenol and resorcinol with dialkyl ketones, formaldehyde, alkyl aldehydes and aryl aldehydes.

7. The improved process of claim 6 wherein said selected member is resorcinol.

8. The improved process of claim 6 wherein said selected member is m-aminophenol.

9. The improved process of claim 6 wherein said selected member is m-phenylene diamine.

10. The improved process of claim 6 wherein said selected member is resorcinol diacetate.

11. The improved process of claim 6 wherein said selected member is the condensation product of resorcinol and formaldehyde in a molar ratio of from 1:0.5 to 1:0.9.

12. A coated textile article comprising a vulcanized rubber coating in direct adhering contact with the said textile on at least one side thereof, said textile including fibers selected from the group consisting of cellulose, polyamides, polyesters and polyacrylonitrile, said vulcanized rubber coating containing a residue of an N-substituted 1,3,5-dioxazine.

13. The article of claim 12 in which said cellulose is selected from the group consisting of rayon and cotton.

14. The textile of claim 12 wherein said vulcanized rubber also contains a member selected from the group consisting of 1,5-dihydroxynaphthalene, m-phenylene diamine, m-aminophenol, resorcinol, etherified and esterified m-aminophenol and resorcinol and condensates of m-aminophenol and resorcinol with dialkyl ketones, formaldehyde, alkyl aldehydes and aryl aldehydes.

References Cited

UNITED STATES PATENTS

| | | | |
|---|---|---|---|
| 2,981,741 | 4/1961 | Buckwalter et al. | 161—241 |
| 3,018,207 | 1/1962 | Danielson. | |
| 3,281,310 | 10/1966 | Danielson | 161—247 |
| 3,281,311 | 10/1966 | Paul | 161—241 |

JOHN T. GOOLKASIAN, Primary Examiner

W. E. HOAG, Assistant Examiner

U.S. Cl. X.R.

156—110; 156—306; 171—143, 144, 162; 260—3, 845, 848, 244